US010018261B2

(12) United States Patent
Tsuji et al.

(10) Patent No.: US 10,018,261 B2
(45) Date of Patent: Jul. 10, 2018

(54) STARTING DEVICE

(71) Applicant: AISIN AW CO., LTD., Anjo-shi, Aichi-ken (JP)

(72) Inventors: Hiroki Tsuji, Anjo (JP); Yohei Fujita, Okazaki (JP); Tomoki Inagaki, Hekinan (JP); Hideaki Miyakoshi, Anjo (JP)

(73) Assignee: AISIN AW CO., LTD., Anjo-shi, Aichi-ken (JP)

( * ) Notice: Subject to any disclaimer, the term of this patent is extended or adjusted under 35 U.S.C. 154(b) by 20 days.

(21) Appl. No.: 15/324,435

(22) PCT Filed: Aug. 10, 2015

(86) PCT No.: PCT/JP2015/072680
§ 371 (c)(1),
(2) Date: Jan. 6, 2017

(87) PCT Pub. No.: WO2016/021741
PCT Pub. Date: Feb. 11, 2016

(65) Prior Publication Data
US 2017/0198795 A1 Jul. 13, 2017

(30) Foreign Application Priority Data

Aug. 8, 2014 (JP) ................. 2014-162255

(51) Int. Cl.
*F16H 45/02* (2006.01)
*F16H 41/24* (2006.01)
(Continued)

(52) U.S. Cl.
CPC ......... *F16H 45/02* (2013.01); *F16F 15/1202* (2013.01); *F16F 15/12353* (2013.01); *F16H 41/24* (2013.01); *F16H 2045/0231* (2013.01)

(58) Field of Classification Search
CPC ...... F16H 45/02; F16H 41/24; F16F 15/1202; F16F 15/12353
See application file for complete search history.

(56) References Cited

U.S. PATENT DOCUMENTS 9,506,518 B2 * 11/2016 Otanez ................. F16F 15/145
2009/0125202 A1    5/2009 Swank et al.
(Continued)

FOREIGN PATENT DOCUMENTS

JP    2009-115112 A    5/2009
JP    2011-503474 A    1/2011
(Continued)

OTHER PUBLICATIONS

International Search Report of PCT/JP2015/072680 dated Oct. 27, 2015 [PCT/ISA/210].

*Primary Examiner* — David J Hlavka
(74) *Attorney, Agent, or Firm* — Sughrue Mion, PLLC

(57) ABSTRACT

When "It" is defined as the moment of inertia of all elements included in a torque transmission path from a front cover 3 to a damper hub 7, "Im" is defined as the moment of inertia of a first intermediate member 12 coupled to a vibration absorption spring Spd of a dynamic damper 20, "Idd" is defined as the moment of inertia of a mass body of the dynamic damper 20, "A=Im/It", "B=Idd/Im", and "Netag" is defined as a rotation speed of an engine corresponding to a frequency of vibration to be damped by the dynamic damper, the starting device is configured so as to satisfy $0.04 \leq A \leq 0.10$, $0.90 \leq B \leq 2.60$ and 900 rpm$\leq$Netag$\leq$1400 rpm.

14 Claims, 8 Drawing Sheets

(51) Int. Cl.
*F16F 15/123* (2006.01)
*F16F 15/12* (2006.01)

(56) References Cited

U.S. PATENT DOCUMENTS

| | | | |
|---|---|---|---|
| 2012/0252587 A1 | 10/2012 | Takikawa et al. | |
| 2013/0205944 A1 | 8/2013 | Sudau et al. | |
| 2014/0174250 A1* | 6/2014 | Takikawa | F16F 15/173 74/573.1 |
| 2014/0174869 A1* | 6/2014 | Takikawa | F16F 15/145 188/378 |
| 2017/0227088 A1* | 8/2017 | Takikawa | F16F 15/13492 |

FOREIGN PATENT DOCUMENTS

| | | | |
|---|---|---|---|
| JP | 2012-077827 A | 4/2012 |
| JP | 2012-202543 A | 10/2012 |
| JP | 5051447 B2 | 10/2012 |

* cited by examiner

| MAXIMUM E/G TORQUE (Nm) | 175 | 325 | 550 |
|---|---|---|---|
| TORUS DIAMETER (mm) | 210 | 230 | 250 |
| It (kgm$^2$) | 0.1000 | 0.1500 | 0.2400 |
| Im (kgm$^2$) | 0.0090 | 0.0113 | 0.0132 |
| Idd (kgm$^2$) | 0.0207 | 0.0191 | 0.0198 |
| A=Im/It | 0.090 | 0.075 | 0.055 |
| B=Idd/Im | 2.3 | 1.7 | 1.5 |
| Netag (rpm) | 900 | 1100 | 1300 | us
STARTING DEVICE

CROSS REFERENCE TO RELATED APPLICATIONS

This application is a National Stage of International Application No. PCT/JP2015/072680, filed Aug. 10, 2015, claiming priority based on Japanese Patent Application No. 2014-162255, filed Aug. 8, 2014, the contents of all of which are incorporated herein by reference in their entirety.

TECHNICAL FIELD

The present disclosure relates to a starting device including an input member to which power from an internal combustion engine is transmitted, an output member coupled to an input shaft of a transmission, a damper mechanism and a dynamic damper.

BACKGROUND ART

There has been hitherto known a fluid transmission device including a pump impeller coupled to a drive shaft, a turbine runner coupled to a driven shaft, a lock-up clutch for directly coupling the turbine runner to the drive shaft and a damper mechanism interposed between the turbine runner and the lock-up clutch (for example, refer to Patent Literature 1). The damper mechanism of the fluid transmission device includes an inertia mass body relatively rotatable with respect to the lock-up clutch and the turbine runner, a first elastic body connecting the inertia mass body to the lock-up clutch and a second elastic body connecting the inertia mass body to the turbine runner. The inertia mass body further includes a mass main body, an additional mass body having a relatively smaller inertia mass than the mass main body and a third elastic body. The additional mass body is relatively rotatable with respect to the mass main body and connected to the mass main body through the third elastic body, which forms a dynamic damper with the third elastic body. In the fluid transmission device, the total inertia mass of the mass main body and the additional mass body is set to 0.7 times or more of the inertia mass of the turbine runner (including an engaging means), thereby improving the damping capacity of torsional vibration in a low rotation region of the damper mechanism and expanding a lock-up area to the low rotation region.

CITATION LIST

Patent Literature

Patent Literature 1: Japanese Patent No. 5051447

SUMMARY OF INVENTION

As in the fluid transmission device described in Patent Document 1, in order to increase the vibration damping performance of the damper mechanism in the low rotation region by setting the total inertia mass of the mass main body and the additional mass body to 0.7 times or more of the inertia mass of the turbine runner while reducing the inertia mass of the additional mass body to be smaller than that of the mass main body, the inertia mass of the mass main body has to be increased. Then, it is necessary to increase the size of the mass main body for increasing the inertia mass of the mass main body, however, there is a limit in increasing the size of the mass main body arranged between the first and second elastic bodies, and the vibration damping performance of the damper mechanism in the low rotation region is not improved much in the result in the above fluid transmission device. When the inertia mass of the mass main body is increased, resonance of the mass main body occurs before the engine rotation speed is not increased much after the lock-up is executed, which makes it difficult to improve the vibration damping performance of the damper mechanism just after the lock-up. Furthermore, when the inertia mass of the additional mass body is reduced to be smaller than that of the mass main body, the vibration damping performance of the dynamic damper may be reduced.

In view of the above, an aspect of the present disclosure is to further improve the vibration damping performance in the low rotation region in the starting device having the damper mechanism to which the dynamic damper is coupled.

According to an exemplary embodiment, there is provided a starting device having an input member to which power from the internal combustion engine is transmitted, an output member coupled to an input shaft of a transmission, a damper mechanism including an input element coupled to the input member, an intermediate element, an output element coupled to the output member, a first elastic body transmitting a torque between the input element and the intermediate element, a second elastic body transmitting the torque between the intermediate element and the output element and a dynamic damper including a mass body and a vibration absorption elastic body arranged between the mass body and the intermediate element of the damper mechanism, in which, when "It" is defined as the moment of inertia of all elements included in a torque transmission path from the input member to the output member, "Im" is defined as the moment of inertia of the intermediate member coupled to the vibration absorption elastic body, "Idd" is defined as the moment of inertia of the mass body of the dynamic damper, "A=Im/It", "B=Idd/Im", and "Netag" is defined as a rotation speed of the internal combustion engine corresponding to a frequency of vibration to be damped by the dynamic damper, the starting device is configured so as to satisfy $0.04 \leq A \leq 0.10$, $0.90 \leq B \leq 2.60$ and 900 rpm $\leq$ Netag $\leq$ 1400 rpm.

The present inventors have made earnest study and analysis in the starting device including the damper mechanism in which the dynamic damper is coupled to the intermediate member so as to improve vibration damping performance in a low rotation region. As a result, the present inventors have found that the vibration damping performance in the low rotation region can be further improved by reducing the moment of inertia of the intermediate element and increasing the moment of inertia of the mass body of the dynamic damper. That is, when the starting device is configured so as to satisfy 0.04≤A=Im/It≤0.10, 0.90≤B=Idd/Im≤2.60 and 900 rpm≤Netag≤1400 rpm, it becomes possible to shift a resonance point of the intermediate element generated in a state where the torque from the internal combustion engine is transmitted to the input element through the input member to a higher rotation side (higher frequency side) and further expand a range of rotation speed in which vibration can be damped in good condition by the dynamic damper. Accordingly, the coupling between the internal combustion engine and the input element in a further lower rotation speed is allowed as well as vibration from the internal combustion engine can be damped in extremely good condition by the damper mechanism and the dynamic damper just after the internal combustion engine is coupled to the input element. Consequently, it is possible to further improve the vibration damping performance in the low rotation region in the starting device having the damper mechanism to which the dynamic damper is coupled. The intermediate element of the damper mechanism may include a first intermediate element coupled to the vibration absorption elastic body and a second intermediate element coupled to the first intermediate member through a third elastic body, in that case, the moment of inertia of the first intermediate element is configured to satisfy the above conditions.

DESCRIPTION OF EMBODIMENTS

Next, modes for carrying out the various aspects of the present disclosure will be explained with reference to the drawings.

Figure 1:
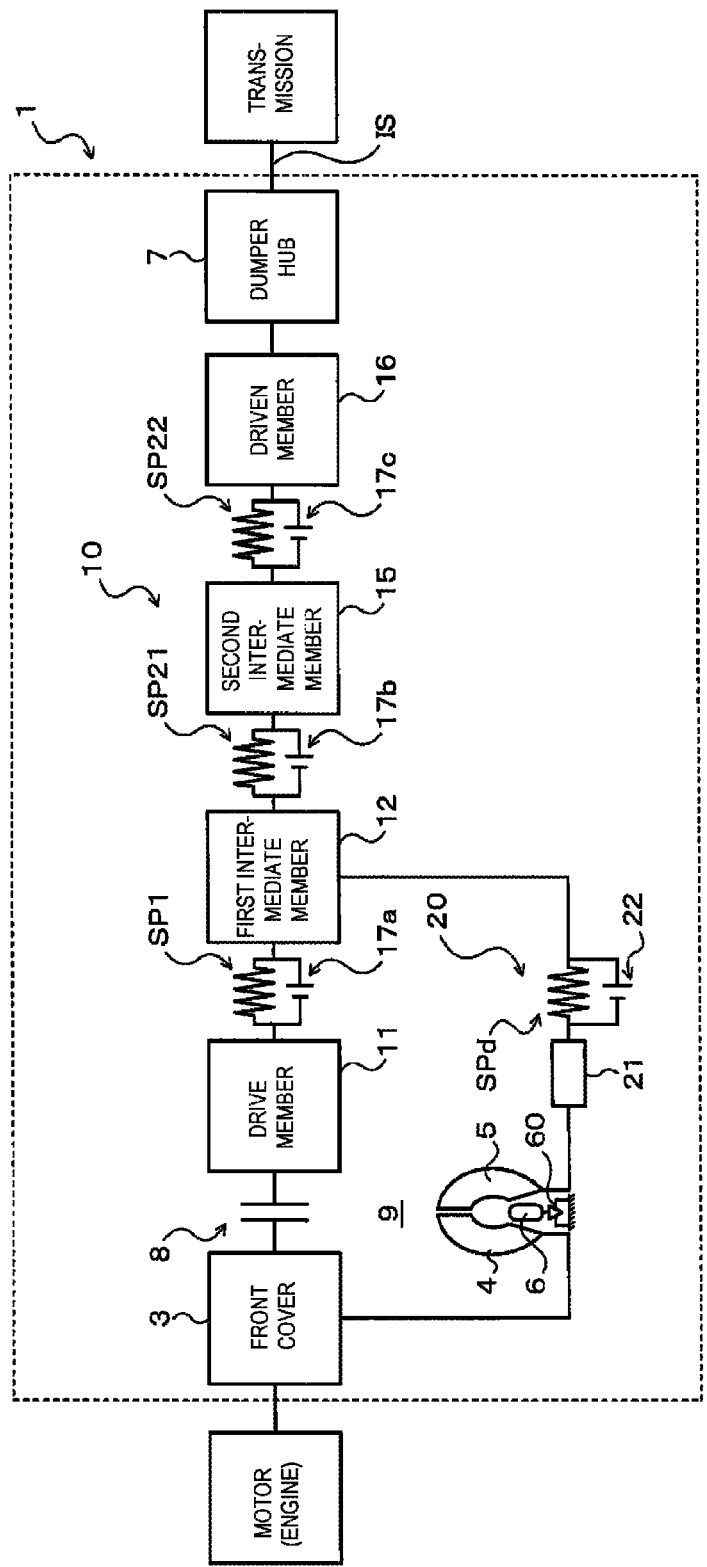
FIG. 1 is a schematic configuration view showing a starting device according to an embodiment of the present disclosure.

FIG. 1 is a schematic configuration view showing a starting device 1 according to an embodiment of the present disclosure. The starting device 1 shown in the drawing is mounted on a vehicle having an engine (four-stroke internal combustion engine) as a motor, including a front cover 3 as an input member coupled to a crank shaft of the engine in addition to a damper mechanism 10, a pump impeller (input-side fluid transmission element) 4 fixed to the front cover 3, a turbine runner (output-side fluid transmission element) 5 which is coaxially rotatable with the pump impeller 4, a damper hub 7 as an output member coupled to the damper mechanism 10 as well as fixed to an input shaft IS of a transmission as an automatic transmission (AT) or a continuously variable transmission (CVT), a lock-up clutch 8, the damper mechanism 10, a dynamic damper 20 coupled to the damper mechanism and so on.

In the following description, an "axial direction" basically indicates an extending direction of the central axis (axial center) of the starting device 1 or the damper mechanism 10 except directions particularly specified. A "radial direction" basically indicates a radial direction of the starting device 1, the damper mechanism 10, or rotating elements such as the damper mechanism 10, namely, an extending direction of a straight line which extends from the central axis of the starting device 1 or the damper mechanism 10 to a direction orthogonal to the central axis (radial direction) except directions particularly specified. Furthermore, a "circumferential direction" basically indicates a circumferential direction of the starting device 1 or the damper mechanism, or rotating elements such as the damper mechanism 10, namely, a direction along a rotating direction of the rotating elements except directions particularly specified.

The pump impeller 4 includes a not-shown pump shell tightly fixed to the front cover 3 and plural pump blades (not shown) arranged inside the pump shell. The turbine runner 5 includes a not-shown turbine shell and plural turbine blades (not shown) arranged inside the turbine shell. In the embodiment, an inner peripheral portion of the turbine shell of the turbine runner 5 is fixed to a not-shown turbine hub through plural rivets, and the turbine hub is supported by the damper hub 7 so as to rotate freely. The pump impeller 4 and the turbine runner 5 face each other, and a stator 6 rectifying the flow of working oil (working fluid) from the turbine runner 5 to the pump impeller 4 is coaxially arranged between the pump impeller 4 and the turbine runner 5. The stator 6 has plural stator blades, and a rotating direction of the stator 6 is set to only one direction by a one-way clutch 60. The pump impeller 4, the turbine runner 5 and the stator 6 form a torus (annular channel) for circulating the working oil, which functions as a torque converter (fluid transmission device) having a torque amplification function. However, the stator 6 or the one-way clutch 60 may be omitted in the starting device 1 to allow the pump impeller 4 and the turbine runner 5 to function as a fluid coupling.

The lock-up clutch 8 performs the lock-up for coupling the front cover 3 to the damper hub 7, namely, the input shaft IS of the transmission through the damper mechanism 10 as well as cancels the lock-up. In the embodiment, the lock-up clutch 8 is configured as a multiple-disc hydraulic clutch including a lock-up piston supported by a center piece fixed to the front cover 3 so as to move freely in the axial direction, an annular clutch drum, an annular clutch hub fixed to the front cover so as to face the lock-up piston, plural first friction engagement plates (friction plates having friction materials on both surfaces) which are spline-fitted to an inner peripheral surface of the clutch drum and plural second friction engagement plates (separator plates) which are spline-fitted to an outer peripheral surface of the clutch hub (both are not shown).

The lock-up clutch 8 further includes a not-shown flange member (oil chamber defining member) attached to the center piece of the front cover 3, and plural return springs (not shown) arranged between the front cover 3 and the lock-up piston. The lock-up piston and the flange member define an engagement oil chamber to which the working oil (engagement oil pressure) is supplied from a not-shown hydraulic controller. The lock-up piston is moved in the axial direction so as to press the first and second friction engagement plates toward the front cover 3 by increasing the engagement oil pressure to the engagement oil chamber, thereby engaging the lock-up clutch 8 (complete engagement or slip engagement). The lock-up clutch 8 may also be formed as a single-disc hydraulic clutch.

The damper mechanism 10 includes, as shown in FIG. 1, a drive member (input element) 11, a first intermediate member (first intermediate element) 12, a second intermediate member (second intermediate element) 15 and a driven member (output element) 16 as rotating elements, and includes plural (for example, 2 to 6 springs in the embodiment) outer springs (first elastic bodies) SP1 arranged close to the outer periphery of the damper mechanism 10, plural and the same number (for example, three springs each in the embodiment) of the first inner springs (third elastic bodies) SP21 and the second inner springs (second elastic bodies) SP22 which are arranged in the inner side of the outer springs SP1 as torque transmission elements.

As the outer springs SP1, the first and second inner springs SP21, SP22, an arc coil spring formed of a metal material wound so as to have an axial center extending in an arc shape when a load is not added, or a straight coil spring formed of a metal material wound in a spiral shape so as to have an axial center extending straight when the load is not added is adopted. The first and second inner springs SP21, SP22 may have the same specifications (rigidity, namely, a spring constant and so on) as well as may have different specifications from each other.

The drive member 11 is configured by the clutch drum of the lock-up clutch 8 and a not-shown annular drive plate coupled to the clutch drum through plural rivets, which is arranged in an outer peripheral side area inside a fluid transmission chamber 9 defined by the front cover 3 and the pump shell of the pump impeller 4. The plural outer springs SP1 are supported by the clutch drum and the drive plate coupled with each other at intervals (at equal intervals) in the circumferential direction, which are arranged in the outer peripheral side area inside the fluid transmission chamber 9 so as to be close to the outer periphery of the damper mechanism 10. The clutch drum and the drive plate respectively include plural (for example, 2 to 6 portions in the embodiment) spring abutting portions arranged so as to be lined up at intervals (at equal intervals) in the circumferential direction. The each spring abutting portion of the clutch drum and the drive plate abuts on both end portions of the outer springs SP1 adjacent to each other between them in a mounted state of the damper mechanism 10.

The first intermediate member 12 is configured by a not-shown first plate member arranged close to the front cover 3 and a not-shown annular second plate arranged near the turbine runner 5 as well as coupled (fixed) to the first plate member through plural rivets. The first plate member includes plural (for example, 2 to 6 portions in the embodiment) outer spring abutting portions arranged so as to be lined up at intervals (at equal intervals) in the circumferential direction and plural (for example, 3 portions in the embodiment) inner spring abutting portions arranged so as to be lined up at intervals (at equal intervals) in the circumferential direction. The second plate member includes plural (for example, 6 portions in the embodiment) outer spring abutting portions arranged so as to be lined up at intervals in the circumferential direction and plural (for example, 3 portions in the embodiment) inner spring abutting portions arranged so as to be lined up at intervals (at equal intervals) in the circumferential direction.

Each outer spring abutting portion of the first plate member included in the first intermediate member 12 abuts on both end portions of the outer springs SP1 adjacent to each other between them in the mounted state of the damper mechanism 10. The first inner springs SP21 and the second inner springs SP22 are supported by the first and second plate members coupled with one another so as to be alternately lined up at intervals in the circumferential direction inside the plural outer spring SP1 in the radial direction. Each of inner spring abutting portions of the first and second plate members abuts on both end portions of the first inner spring SP21 and the second inner spring SP22 which do not make a pair (not acting in series) between them in the mounted state of the damper mechanism 10.

The second intermediate member 15 is arranged between the first plate member and the second plate member, which is supported (aligned) so as to rotate freely by, for example, the drive plate included in the drive member 11. The second intermediate member 15 is formed as an annular plate body, having plural (for example, three portions in the embodiment) spring abutting portions extended from an inner peripheral portion to the inner side in the radial direction and lined up at intervals (at equal intervals) in the circumferential direction. Each spring abutting portion of the second intermediate member 15 abuts on both end portions of the first and second inner springs SP21 and SP22 which make a pair between them. Accordingly, a pair of the first and second inner springs SP21 and SP22 are coupled in series through the spring abutting portion of the second intermediate member 15, which can reduce the stiffness of the torque transmission elements arranged inside the outer springs SP1.

The driven member 16 is arranged between the first plate member and the second plate member of the first intermediate member 12 and fixed to the damper hub 7 through plural rivets. The driven member 16 includes plural (for example, three portions in the embodiment) spring abutting portions formed at intervals in the circumferential direction and extending to the outer side in the radial direction. Each spring abutting portion of the driven member 16 abuts both end portions of the first and second inner springs SP21 and SP22 which do not make a pair (not acting in series) between them in the mounted state of the damper mechanism 10. Accordingly, the driven member 16 is coupled to the drive member 11 through the plural outer springs SP1, the first intermediate member 12, the plural first inner springs SP21, the second intermediate member 15 and the plural second inner spring SP22.

The damper mechanism 10 further includes a first stopper 17a regulating relative rotation between the drive member 11 and the first intermediate member 12, a second stopper 17b regulating relative rotation between the first intermediate member 12 and the second intermediate member 15 and a third stopper 17c regulating relative rotation between the second intermediate member 15 and the driven member 16 as rotation regulating stoppers for regulating relative rotation between the drive member 11 and the driven member 16. When a torque to be transmitted to the front cover 3, namely, an input torque to the drive member 11 is increased in the embodiment, the relative rotation between the first and second intermediate members 12 and 15 and the relative rotation between the second intermediate member 15 and the driven member 16 are regulated at the same time by the second and third stoppers 17b and 17c before the relative rotation between the drive device 11 and the first intermediate member 12 is regulated by the first stopper 17a. However, the second and third stoppers 17b and 17c may be configured so as not to be operated at the same time. It is also preferable to use a stopper for regulating relative rotation between the first intermediate member 12 and the driven member 16 instead of using the second and third stoppers 17b, 17c.

The dynamic damper 20 includes an annular coupling member 21 and plural (for example, three springs in the embodiment) vibration absorption springs (vibration absorbing elastic bodies) SPd which are straight coil springs or arc coil springs arranged between the coupling member 21 and the first intermediate member 12 of the damper mechanism 10. The coupling member 21 is disposed, for example, between the turbine runner 5 and the second plate member of the first intermediate member 12 in the axial direction, and an inner peripheral portion thereof is fixed to the turbine hub with the inner peripheral portion of the turbine shell through rivets. Accordingly, the coupling member 21 forms a mass body of the dynamic damper 20 with the turbine runner 5 and the turbine hub. Here, the "dynamic damper" is a mechanism for damping vibration by adding vibration in an opposite phase to a vibrating body at a frequency (engine rotation speed) corresponding to a resonant frequency of the vibrating body, which is configured by coupling the springs (elastic bodies) and the mass body to the vibrating body (the first intermediate member 12 in the embodiment) so as not to be included in the torque transmission path. That is, vibration at a desired frequency can be damped by the dynamic damper 20 by adjusting the stiffness of the vibration absorption springs SPd and the moment of inertia of the mass body.

In the embodiment, the coupling member 21 includes a first annular member coupled to the turbine runner 5 and a second annular member coupled to the first coupling member through plural rivets. The plural vibration absorption springs SPd are supported so as to be lined up at intervals (at equal intervals) in the circumferential direction by the first and second annular members coupled to each other, which are disposed in an area which tends to be a dead space in the vicinity of the outer peripheral portion of the turbine runner 5. The first and second annular members respectively have plural (for example, three portions in the embodiment) spring abutting portions formed so as to be lined up at intervals in the circumferential direction. Each of spring abutting portions of the first and second annular members abuts on both end portions of the vibration absorption springs SPd adjacent to each other between them.

Furthermore, each outer spring abutting portion of the second plate member included in the first intermediate member 12 abuts on end portions of the corresponding vibration absorption spring SPd in the mounted state of the damper mechanism 10. That is, both end portions of each vibration absorption spring SPd abut on corresponding one sides of the two outer spring abutting portions of the second plate member which make a pair. Accordingly, the vibration absorbing SPd, the coupling member 21, the turbine runner 5 and the turbine hub, namely, the dynamic damper 20 is coupled to the first intermediate member of the damper mechanism 10. The dynamic damper 20 (damper mechanism 10) includes a fourth stopper 22 for regulating relative rotation between the coupling member 21 and the first intermediate member 12. When relative rotation between the coupling member 21 and the first intermediate member 12 is regulated by the fourth stopper 22, the torsion of respective vibration absorption springs SPd is regulated. The plural vibration absorption springs SPd may be disposed so as to be lined up along the outer springs SP1 of the damper mechanism 10 in the circumferential direction. It is also preferable that, for example, the drive member 11 is configured to be coupled to the vibration absorption springs SPd in accordance with the increase of the input torque before the relative rotation between the drive member 11 and the driven member 16 is regulated, and that the vibration absorption springs SPd are allowed to function as elastic bodies which transmit the torque between the drive member 11 and the first intermediate member 12.

In the starting device 1 configured as described above, when the lock-up is released by the lock-up clutch 8, the torque (power) transmitted from the engine to the front cover 3 is transmitted to the input shaft IS of the transmission through a path including the pump impeller 4, the turbine runner 5, the coupling member 21, the plural vibration absorption springs SPd, the first intermediate member 12, the plural first inner springs SP 21, the second intermediate member 15, the plural second inner springs SP 22, the driven member 16 and the damper hub 7. When a relatively large torque is transmitted from the engine to the front cover 3 in a state where the lock-up is released, respective vibration absorption springs SPd are contracted. When respective vibration absorption springs SPd are contracted in some degree, the relative rotation between the coupling member 21 and the first intermediate member 12, namely, the torsion of respective vibration absorption springs SPd is restricted by the fourth stopper 22. Accordingly, respective vibration absorption springs SPd are not contracted any more, and the torque from the turbine runner 5 is transmitted to the first intermediate member 12 not only through the contracted respective vibration absorption springs SPd but also through the fourth stopper 22. As a result, the transmission of torque from the turbine runner 5 to the first intermediate member 12 in a state where respective vibration absorption springs SPd are completely contracted is suppressed when the lock-up is released, thereby further improving the durability of respective vibration absorption springs SPd.

On the other hand, when the lock-up is executed by the lock-up clutch 8 of the starting device 1, the torque from the engine is transmitted to the input shaft IS of the transmission through a path including the front cover 3, the lock-up clutch 8, the drive member 11, the plural outer springs SP1, the first intermediate member 12, the plural first inner springs SP21, the second intermediate member 15, the plural second inner springs SP22, the driven member 16 and the damper hub 7. At this time, variation of torque inputted into the front cover 3 is damped (absorbed) mainly by the outer springs SP1, the first and second inner springs SP21 and SP22 of the damper mechanism 10 acting in series. Therefore, when the lock-up is executed by the lock-up clutch 8, variation of torque inputted to the front cover 3 can be damped (absorbed) in good condition by the damper mechanism 10 in the starting device 1.

Furthermore, when the first intermediate member 12 is rotated by the torque from the engine with the engine rotation at the time of executing the lock-up, respective outer spring abutting portions of the first intermediate member 12 (the second plate member) press corresponding one ends of the vibration absorption springs SPd, and the other ends of the vibration absorption springs SPd press corresponding spring abutting portions of the coupling member 21. As a result, the dynamic damper 20 including the turbine runner 5, the coupling member 21, the plural vibration absorption springs SPd and so on is coupled to the first intermediate member 12 of the damper mechanism 10. Accordingly, vibration from the engine can be damped (absorbed) also by the dynamic damper 20.

Next, a design procedure of the starting device 1 will be explained.

The prevent inventors have made earnest study and analysis in the starting device 1 including the damper mechanism 10 in which the dynamic damper 20 is coupled to the first intermediate member 12 so as to improve vibration damping performance in a low rotation region. Specifically, the present inventors made simulations of a torsional vibration system while changing the maximum torque (the maximum E/G torque) of the engine, torus diameters (diameters of the pump impeller and the turbine runner), specifications of the intermediate members and the dynamic damper, an engine rotation speed Netage corresponding to a frequency of vibration to be damped by the dynamic damper, namely, a frequency at an anti-resonance point in a drive train obtained when the dynamic damper is coupled to the damper mechanism included in the drive train from the starting device to a drive shaft of a vehicle and other parameters in the starting device 1 shown in FIG. 1 and starting devices 1B to 1F having configurations shown in FIG. 2 to FIG. 6, calculating specifications of the intermediate members and the dynamic damper which can improve the vibration damping performance in the low rotation region. In such simulations, a lock-up rotation speed Nlug in respective starting devices was set to 1000 rpm.

Figure 2:
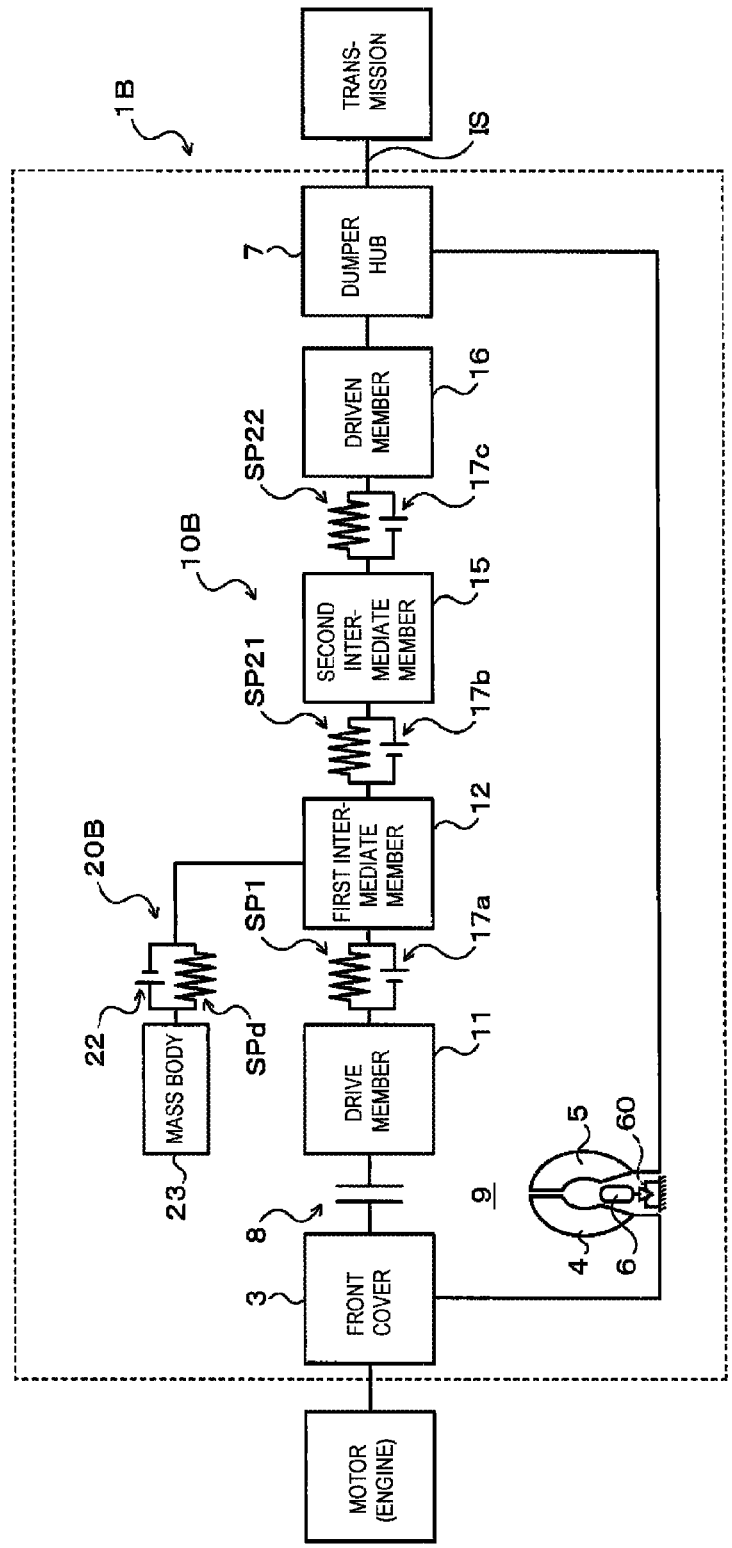
FIG. 2 is a schematic configuration view showing a starting device according to another embodiment of the present disclosure.
Figure 3:
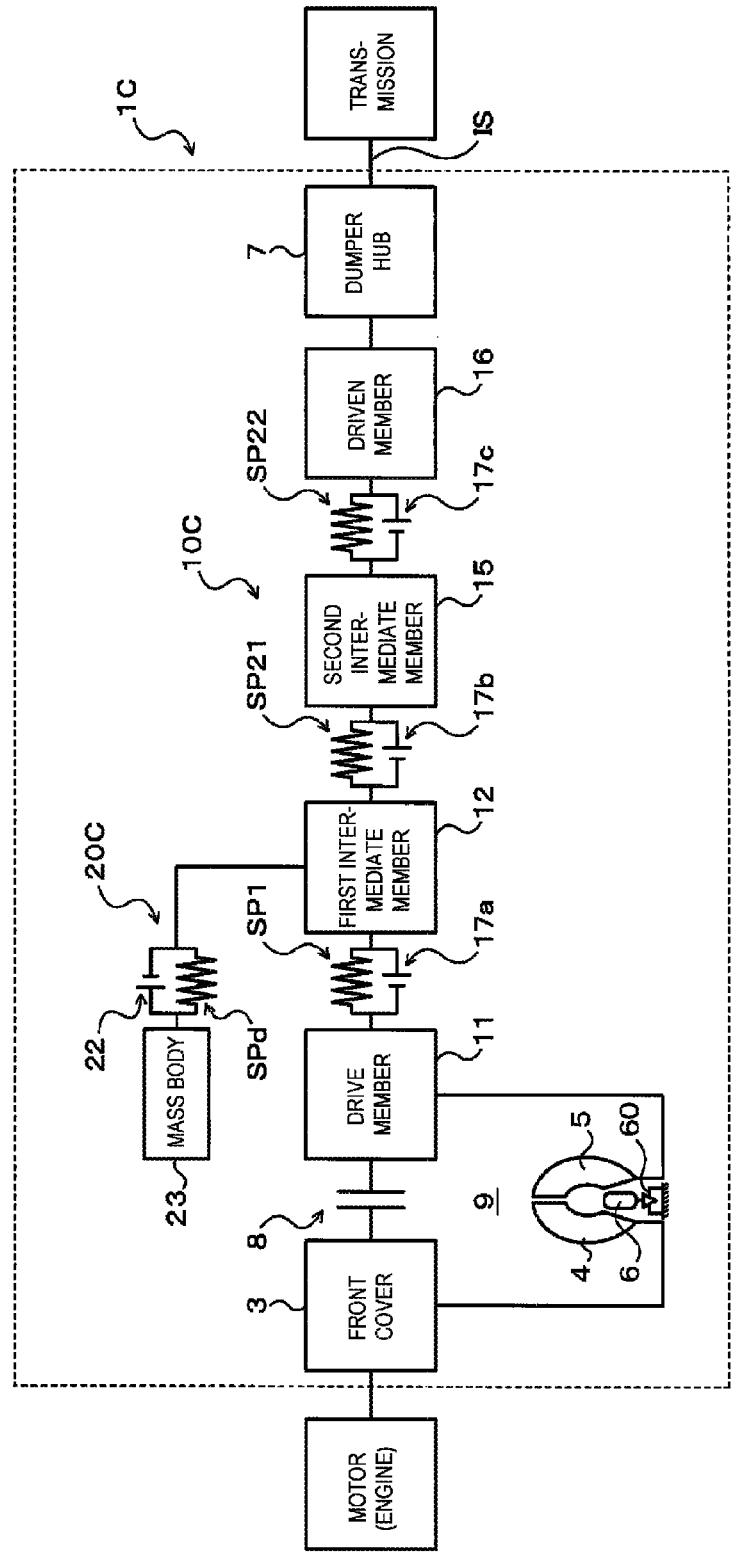
FIG. 3 is a schematic configuration view showing a starting device according to further another embodiment of the present disclosure.

Here, a starting device 1B shown in FIG. 2 includes a dynamic damper 20B having a dedicate mass body 23 not including the turbine runner 5 and coupled to the first intermediate member 12 of a damper mechanism 10B. The turbine runner 5 is coupled to the damper hub (output member) 7 with the driven member 16 of the damper mechanism 10B in the starting device 1B. A starting device 1C shown in FIG. 3 includes a dynamic damper 20C having the dedicate mass body 23 not including the turbine runner 5 and coupled to the first intermediate member 12 of a damper mechanism 10C. The turbine runner 5 is coupled to the drive member (input element) 11 of the damper mechanism 10C in the starting device 1C.

Figure 4:
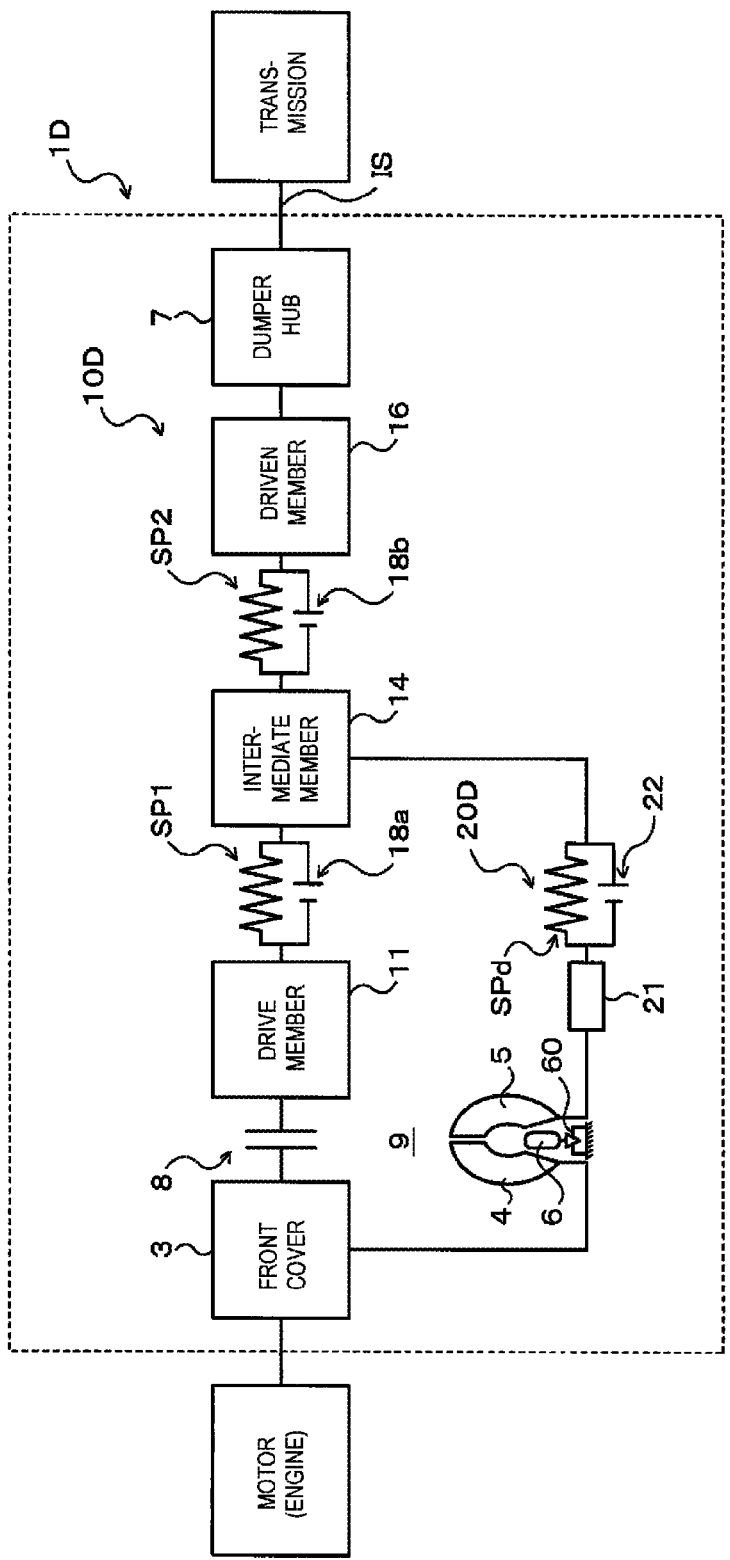
FIG. 4 is a schematic configuration view showing a starting device according to another embodiment of the present disclosure.
Figure 5:
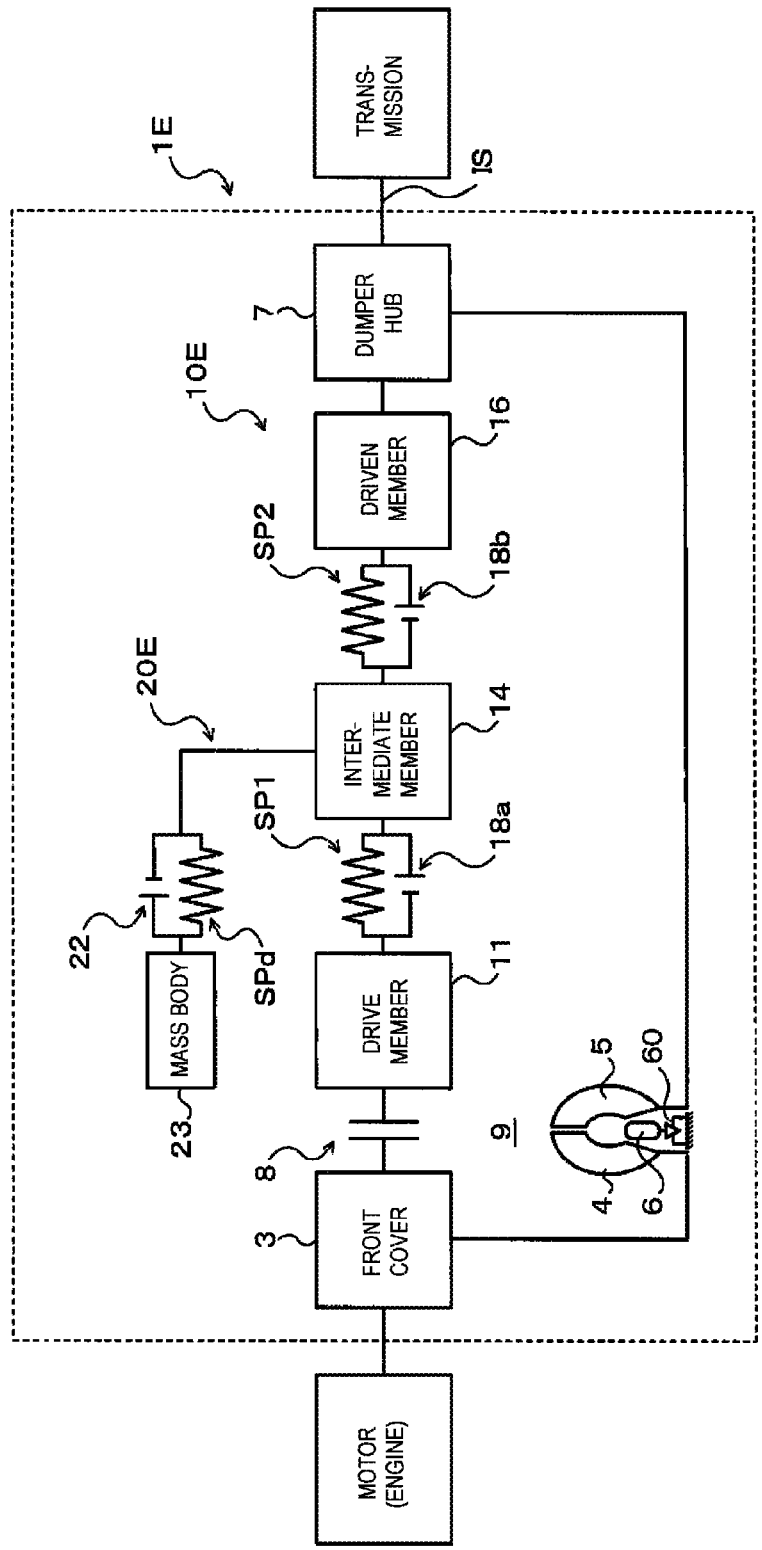
FIG. 5 is a schematic configuration view showing a starting device according to further another embodiment of the present disclosure.
Figure 6:
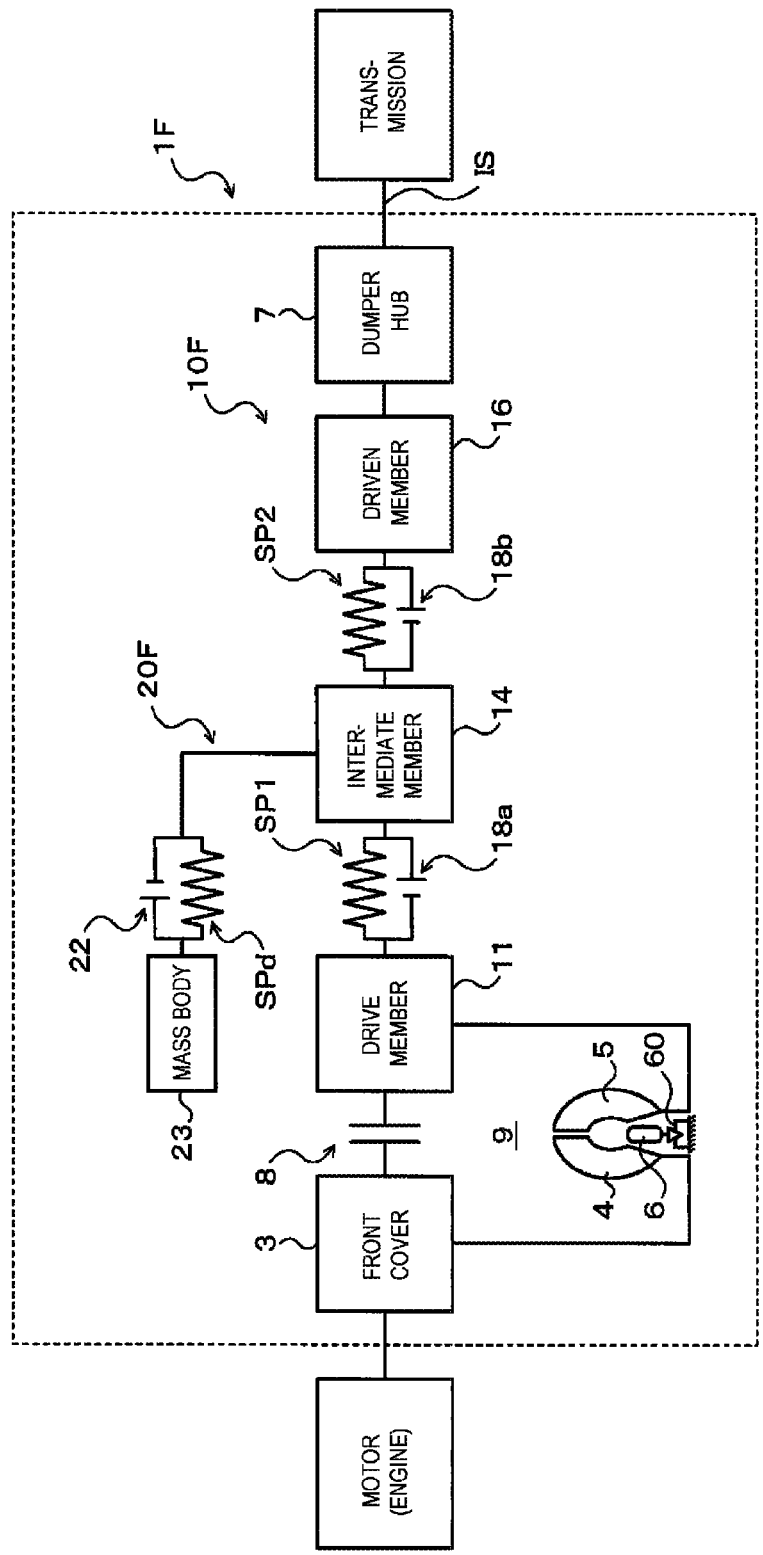
FIG. 6 is a schematic configuration view showing a starting device according to another embodiment of the present disclosure.

On the other hand, each of the starting devices 1D to 1F shown in FIG. 4 to FIG. 6 includes a damper mechanism 10D, 10E or 10F having the drive member 11, an intermediate member 14, the driven member 16, the outer spring (first elastic body) SP1 transmitting torque between the drive member 11 and the intermediate member 14, an inner spring SP2 (second elastic body) SP2 transmitting torque between the intermediate member 14 and the driven member 16, a first stopper 18a regulating relative rotation between the drive member 11 and the intermediate member 14 and a second stopper 18b regulating relative rotation between the intermediate member 14 and the driven member 16, and a dynamic damper 20D, 20E or 20F coupled to the intermediate member 14. The dynamic damper 20 of the starting device 1D shown in FIG. 4 uses the turbine runner 5, the turbine hub, the coupling member 21 and so on as the mass body. The dynamic damper 20E of the starting device 1E shown in FIG. 5 includes the dedicate mass body 23 not including the turbine runner 5, and the turbine runner 5 is coupled to the damper hub (output member) 7 with the driven member 16 of the damper mechanism 10E in the starting device 1E. The dynamic damper 20F of the starting device 1F shown in FIG. 6 has the dedicated mass body 23 not including the turbine runner 5, and the turbine runner 5 is coupled to the drive member (input element) 11 of the damper mechanism 10F in the starting device 1F.

Figures 7, 8:
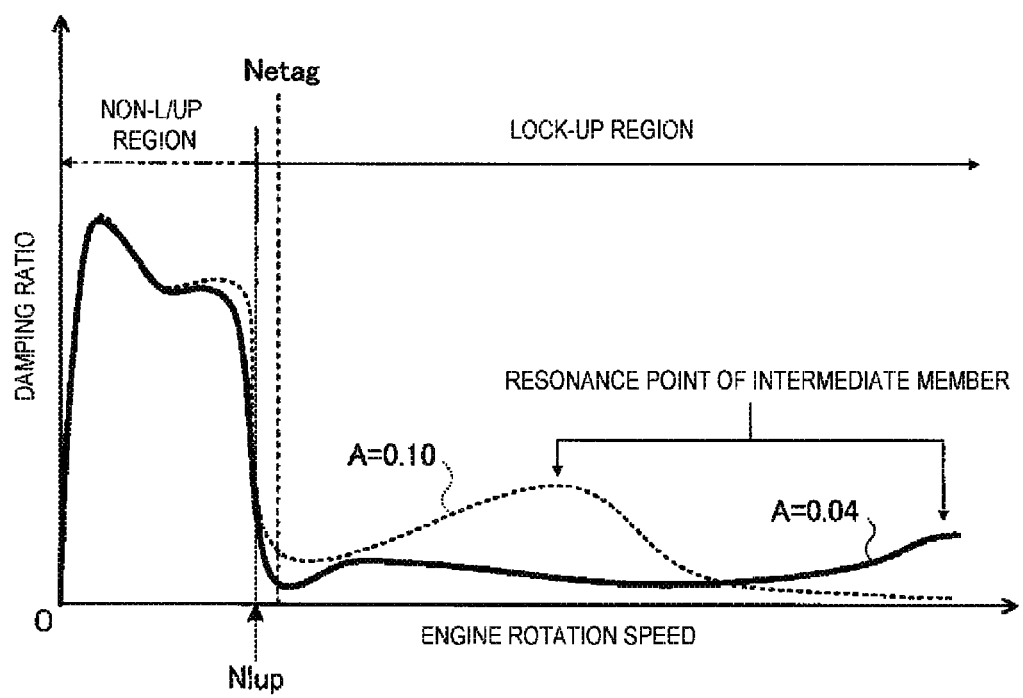
FIG. 7 is a table showing simulation results of a torsional vibration system concerning the starting devices of the present disclosure.
FIG. 8 is a chart showing simulation results of the torsional vibration system concerning the starting device of the present disclosure.

FIG. 7 shows results of simulations made by the present inventors. FIG. 7 shows the maximum torque of the engine, the torus diameter, specifications of the intermediate member and the dynamic damper in the starting devices securing practically good vibration damping performance in the low rotation region in which the engine rotation speed is, for example, within a range of 1000 rpm to 1500 rpm. In FIG. 7, "It" is defined as the moment of inertia of all elements (including components of the lock-up clutch 8) included in the torque transmission path from the front cover (input member) 3 to the damper hub (output member) 7, "Im" is defined as the moment of inertia of the first intermediate member 12 or the intermediate member 14 (single body) coupled to the vibration absorption spring of the dynamic damper, "Idd" is defined as the moment of inertia of the mass body of the dynamic damper 20 and so on, and "Netag" is defined as the engine rotation speed (hereinafter referred to as a "vibration damping rotation speed") corresponding to a frequency of vibration to be damped by the dynamic damper 20 and so on.

The moment of inertia "Im" of the first intermediate member 12 or the intermediate member 14 corresponds to the entire moment of inertia (other than springs supported by the plate members) of the plate members, rivets and so on which configure the first intermediate member 12 and the intermediate member 14. In the case where the turbine runner 5 is included in the mass body of the dynamic damper 20 and so on, the moment of inertia "Idd" of the mass body corresponds to the entire moment of inertia (other than the vibration absorption springs) of the coupling member 21, the turbine runner 5 and so on. Furthermore, when the torus diameters are at least 230 and 250, it has been found that both the starting device including the damper mechanism having the first and second intermediate members 12, 15 and the starting device including the damper mechanism having the intermediate member 14 can be configured. When a frequency of vibration to be damped by the dynamic damper is "ftag", the number of cylinders of the engine is "n" and a spring constant (composite spring constant) of vibration absorption spring SPd is "kdd", the frequency of vibration and the rotation speed of the engine can be represented as "ftag=½π·√(kdd/Idd), Netag [rpm]=ftag×(120/n)".

According to simulation results shown in FIG. 7, it is found that the vibration absorption performance in the low rotation region can be secured in practically good condition by setting a ratio A (=Im/It) of the moment of inertia "Im" of the first intermediate member 12 or the intermediate member 14 with respect to the total moment of inertia "It" to at least values within a range of 0.055 to 0.090. Also according to the simulation results shown in FIG. 7, it is found that the vibration absorption performance in the low rotation region can be secured in practically good condition by setting a ratio B (=Idd/Im) of the moment of inertia Idd of the mass body of the dynamic damper with respect to the moment of inertia Im of the first intermediate member 12 or the intermediate member 14 to at least values within a range of 1.5 to 2.3. Further according to the simulation results shown in FIG. 7, it is found that the vibration absorption performance in the low rotation region can be secured in practically good condition by setting the vibration damping rotation speed Netag to at least values within a range of 900 to 1300 rpm. The present inventors have made further analyses (simulations) for further optimizing the ranges in which the ratios A, B and the vibration damping rotation speed Netag of the dynamic damper can be set based on the simulation results shown in FIG. 7, empirical knowledge and so on.

FIG. 8 shows simulation results of the relationship between the engine rotation speed and the damping ratio (torque variation in the driven member) obtained when the moment of inertia "Im" of the intermediate member, that is, the ratio A is changed in the starting device configured so that the ratio B and the vibration damping rotation speed Netag of the dynamic damper are included in the ranges shown in FIG. 7. The simulations concerning FIG. 8 were targeted at a starting device having the configuration shown in FIG. 1, in which the maximum torque=550 Nm, the moment of inertia It=0.2400, the moment of inertia Idd=0.0198 and Netag=1300. In FIG. 8, a solid line indicates the relationship between the engine rotation speed and the damping ratio obtained when the ratio A=0.04 (Im=0.0096), and a dotted line indicates the relationship between engine rotation speed and the damping ratio obtained when the ratio A=0.10 (Im=0.0240).

As shown in the drawing, a resonance point of the entire damper mechanism generated in the state where the torque is transmitted from the engine to the drive member 11 by the execution of the lock-up (the resonance point in the lowest rotation side (lowest frequency side) in the drawing) and a resonance point generated by coupling the dynamic damper to the damper mechanism (the second resonance point from the left in the drawing) were both recognized in the lower rotation side than the lock-up rotation speed Nlup in both cases where the ratio A=0.04 and where the ratio A=0.10. In the case where the ratio A=0.04, the resonance point of the intermediate member (first intermediate member 12) was recognized at a stage where the engine rotation speed exceeds at least 1500 rpm, and it was confirmed that the vibration damping performance in the low rotation region where the engine rotation speed is in a range of 1000 rpm to 1500 rpm can be secured in extremely good condition practically. On the other hand, in the case where the ratio A=0.10, the resonance point of the intermediate member (first intermediate member 12) was recognized within a range of 1000 rpm to 1500 rpm, however, it was confirmed that the level of resonance (amplitude) of the intermediate member (first intermediate member 12) can be practically allowed as well as can be reduced by adjusting specifications (the moment of inertia Idd) of the dynamic damper 20 and so on. According to the analysis results, it will be understood that values in a range of $0.04 \leq A \leq 0.10$ can be taken as the ratio A, and that the moment of inertia "Im" of the intermediate member is preferably as small as possible while considering other parameters in that range. Also according to the analyses by the present inventors, it has been found that practically good results can be obtained by setting the ratio B and the vibration damping rotation speed Netag so as to be included in the ranges shown in FIG. 7 as well as setting the moment of inertia "Im" of the intermediate member so that $0.04 \leq A \leq 0.10$ is satisfied also in the starting device in which the maximum torque is 175 Nm or 325 Nm (having the configuration shown in FIG. 1) and the starting devices having configurations shown in FIG. 2 to FIG. 6.

Figure 9:
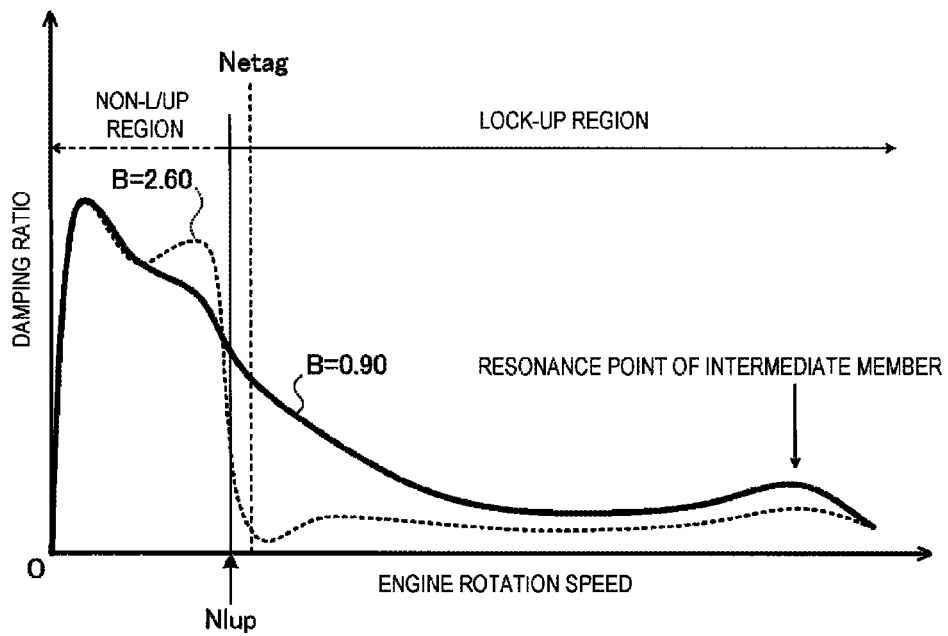
FIG. 9 is a chart showing simulation results of the torsional vibration system concerning the starting device of the present disclosure.

FIG. 9 shows simulation results of the relationship between the engine rotation speed and the damping ratio obtained when the moment of inertia "Idd" of the mass body of the dynamic damper, that is, the ratio B is changed in the starting device configured so that the ratio A and the vibration damping rotation speed Netag of the dynamic damper are included in the ranges shown in FIG. 7. The simulations concerning FIG. 9 were targeted at a starting device having the configuration shown in FIG. 1, in which the maximum torque=550 Nm, the moment of inertia It=0.2400, the moment of inertia Im=0.0132 and Netag=1300. In FIG. 9, a solid line indicates the relationship between the engine rotation speed and the damping ratio obtained when the ratio B=0.90 (Idd=0.00119), and a dotted line indicates the relationship between engine rotation speed and the damping ratio obtained when the ratio B=2.60 (Idd=0.00343).

As shown in the drawing, the resonance point of the intermediate member (first intermediate member 12) was recognized at a stage where the engine rotation speed exceeds at least 1500 rpm in both cases where the ratio B=2.60 and where the ratio B=0.90. In the case where the ratio B=2.60, the resonance point of the entire damper mechanism generated in the state where the torque is transmitted from the engine to the drive member 11 by the execution of the lock-up (the resonance point in the lowest rotation side (lowest frequency side) in the drawing) and the resonance point generated by coupling the dynamic damper to the damper mechanism (the second resonance point from the left in the drawing) were both recognized in the lower rotation side than the lock-up rotation speed Nlup, and it was confirmed that the vibration damping performance in the low rotation region where the engine rotation speed is in a range of 1000 rpm to 1500 rpm can be secured in extremely good condition practically. On the other hand, in the case where the ratio B=0.90, the damping ratio in the vicinity of the lock-up rotation speed Nlup was slightly increased, however, it was confirmed that this can be practically allowed as well as the damping ratio can be reduced by adjusting the moment of inertia of the intermediate member (first intermediate member 12) and the vibration damping rotation speed Netag. According to the analysis results, it will be understood that values in a range of $0.90 \leq B \leq 2.60$ can be taken as the ratio B, and that the moment of inertia "Idd" of the mass body of the dynamic damper is preferably as large as possible while considering other parameters in that range. Also according to the analyses by the present inventors, it has been found that practically good results can be obtained by setting the ratio A and the vibration damping rotation speed Netag so as to be included in the ranges shown in FIG. 7 as well as setting the moment of inertia "Idd" of the mass body of the dynamic damper so that $0.90 \leq b \leq 2.60$ is satisfied also in the starting device in which the maximum torque is 175 Nm or 325 Nm (having the configuration shown in FIG. 1) and the starting devices having configurations shown in FIG. 2 to FIG. 6.

Figure 10:
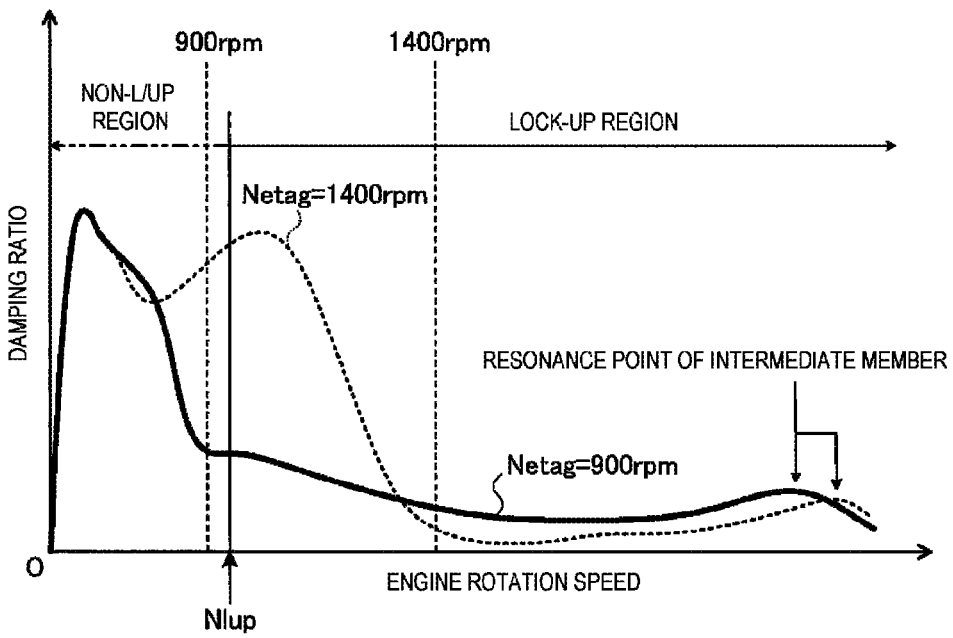
FIG. 10 is a chart showing simulation results of the torsional vibration system concerning the starting device of the present disclosure.

FIG. 10 shows simulation results of the relationship between the engine rotation speed and the damping ratio obtained when the vibration damping rotation speed of the dynamic damper is changed in the starting device configured so that the ratios A and B are included in the ranges shown in FIG. 7. The simulations concerning FIG. 10 targeted at a starting device having the configuration shown in FIG. 1, in which the maximum torque=550 Nm, the moment of inertia It=0.2400, the moment of inertia Im=0.0132 and moment of inertia Idd=0.0198. In FIG. 10, a solid line indicates the relationship between the engine rotation speed and the damping ratio obtained when Netag=900 rpm, and a dotted line indicates the relationship between engine rotation speed and the damping ratio obtained when Netag=1400 rpm.

As shown in the drawing, the resonance point of the intermediate member (first intermediate member 12) was recognized at a stage where the engine rotation speed exceeds at least 1500 rpm in both cases where the vibration damping rotation speed Netag=900 rpm and where the vibration damping rotation speed Netag=1400 rpm. In the case where the vibration damping rotation speed Netag=900 rpm, the resonance point of the entire damper mechanism generated in the state where the torque is transmitted from the engine to the drive member 11 by the execution of the lock-up (the resonance point in the lowest rotation side (lowest frequency side) in the drawing) and the resonance point generated by coupling the dynamic damper to the damper mechanism (the second resonance point from the left in the drawing) were both recognized in the lower rotation side than the vibration damping rotation speed Netag and the lock-up rotation speed Nlup, and it was confirmed that the vibration damping performance in the low rotation region where the engine rotation speed is in a range of 1000 rpm to 1500 rpm can be secured in extremely good condition practically. On the other hand, in the case where the vibration damping rotation speed Netag is 1400 rpm, the resonance point generated by coupling the dynamic damper to the damper mechanism was recognized within a range of 1000 rpm to 1500 rpm, however, it was confirmed that the level of resonance (amplitude) can be reduced by adjusting the moment of inertia "Im" of the intermediate member and the moment of inertia "Idd" of the mass body of the dynamic damper. It is also preferable that the lock-up rotation speed Nlup is increased to, for example, approximately 1200 rpm in this case. According to the analysis results, it will be understood that values in a range of 900 rpm≤Netag≤1400 rpm can be taken as the vibration damping rotation speed Netag, and that the vibration damping rotation speed Netag is preferably as small as possible while considering other parameters in that range. Also according to the analyses by the present inventors, it has been found that practically good results can be obtained by setting the ratios A and B so as to be included in the ranges shown in FIG. 7 as well as setting the vibration damping rotation speed Netag within a range of 900 rpm≤Netag≤1400 rpm also in the starting device in which the maximum torque is 175 Nm or 325 Nm (having the configuration shown in FIG. 1) and the starting devices having configurations shown in FIG. 2 to FIG. 6.

As can be seen from the above explanation, the vibration damping performance in the low rotation region can be further improved in the starting devices 1 to 1F by configuring the starting devices 1 to 1F having the configurations shown in FIG. 1 to FIG. 6 by reducing the moment of inertia "Im" of the first intermediate member 12 or the intermediate member 14 and by increasing the moment of inertia "Idd" of the mass body of the dynamic damper 20 and the like so as to satisfy 0.04≤A=Im/It≤0.10, 0.90≤B=Idd/Im≤2.60 and 900 rpm≤Netag≤1400 rpm. That is, in the starting devices 1 to 1F, the coupling between the engine and the drive member 11 at a low rotation speed such as 1000 rpm is allowed as well as the vibration from the engine can be damped in extremely good condition by the damper mechanism 10 and so on and the dynamic damper 20 and so on just after the engine is coupled to the drive member 11, namely, after the lock-up in the starting devices 1 to 1F.

As described above, the starting device has an input member (3) to which the power from the internal combustion engine is transmitted, an output member (7) coupled to the input shaft (IS) of the transmission, the damper mechanism (10, 10B, 10C, 10D, 10E, 10F) including the input element (11) coupled to the input member (3), the intermediate element (12, 14, 15), the output element (16) coupled to the output member (7), the first elastic body (SP1) transmitting the torque between the input element (11) and the intermediate element (12, 14, 15), the second elastic body (SP22, SP2) transmitting the torque between the intermediate elements (12, 14, 15) and the output element (16) and the dynamic damper (20, 20B, 20C, 20D, 20E, 20F) including the mass body (23) and the vibration absorption elastic body (SPd) arranged between the mass body (23) and the intermediate element (12, 14) of the damper mechanism (10, 10B, 10C, 10D, 10E, 10F), in which, when "It" is defined as the moment of inertia of all elements included in the torque transmission path from the input member (11) to the output member 16", "Im" is defined as the moment of inertia of the intermediate member (12, 14, 16) coupled to the vibration absorption elastic body (Spd), "Idd" is defined as the moment of inertia of the mass body (23) of the dynamic damper (20, 20B, 20C, 20D, 20E, 20F), "A=Im/It", "B=Idd/Im" and "Netag" is defined as the rotation speed of the internal combustion engine corresponding to a frequency of vibration to be damped by the dynamic damper (20, 20B, 20C, 20D, 20E, 20F), the starting device is configured so as to satisfy 0.04≤A≤0.10, 0.90≤B≤2.60 and 900 rpm≤Netag≤1400 rpm.

When the starting device is configured as described above, the resonance point of the intermediate element generated in the state where the torque from the internal combustion engine is transmitted to the input element through the input member can be shifted to the higher rotation side (higher frequency side) and the range of rotation speed in which vibration can be damped in good condition by the dynamic damper can be further expanded. Accordingly, the coupling between the internal combustion engine and the input element in a lower rotation speed is allowed as well as vibration from the internal combustion engine can be damped by the damper mechanism in extremely good condition just after the internal combustion engine is coupled to the input element. As a result, it is possible to further improve the vibration damping performance in the low rotation region in the starting device having the damper mechanism to which the dynamic damper is coupled.

The starting device (1, 1D) may further have the pump impeller (4) and the turbine runner (5), in which the mass body (23) of the dynamic damper (20, 20D) may include the turbine runner (5).

The starting device (1B, 1E) may further have the pump impeller (4) and the turbine runner (5), in which the turbine runner (5) may be coupled to the output member (7).

The starting device (1C, 1F) may further have the pump impeller (4) and the turbine runner (5), in which the turbine runner (5) may be coupled to the input element (11) of the damper mechanism (10C, 10F).

The starting device (1) may further have the pump impeller (4) and the turbine runner (5), in which the intermediate element may include the first intermediate element (12) coupled to the vibration absorption elastic body (SPd) and the second intermediate element (15) coupled to the first intermediate element (12) through the third elastic body (SP21), and the mass body (23) of the dynamic damper (20) may include the turbine runner.

The starting device (1B) may further have the pump impeller (4) and the turbine runner (5), in which the intermediate element may include the first intermediate element (12) coupled to the vibration absorption elastic body (Spd) and the second intermediate element (15) coupled to the first intermediate element (12) through the third elastic body (SP21), and the turbine runner (5) may be coupled to the output member (7).

The starting device (1C) may further have the pump impeller (4) and the turbine runner (5), in which the intermediate element may include the first intermediate element (12) coupled to the vibration absorption elastic body (Spd) and the second intermediate element (15) coupled to the first intermediate element (12) through the third elastic body (SP21), and the turbine runner (5) may be coupled to the input element (11) of the damper mechanism (10C).

The starting device (1, 1B, 1C, 1D, 1E, 1F) may further include the lock-up clutch (8) coupling the input member (3) to the input element (11) of the damper mechanism (10, 10B, 10C, 10D, 10E, 10F) and releasing the coupling between the both.

The exemplary embodiments of the present disclosure is not limited to the above embodiments at all, and it goes without saying that various alterations may occur within a range of extension of the present disclosure. Furthermore, modes for carrying out the exemplary embodiments are just specific examples of the invention described in Summary of Invention, and do not limit elements of the invention described in Summary of Invention.

INDUSTRIAL APPLICABILITY

The invention of the present disclosure can be used in the field of manufacture of the starting device and so on.

The invention claimed is:

1. A starting device comprising:
an input member to which power from an internal combustion engine is transmitted;
an output member coupled to an input shaft of a transmission;
a damper mechanism including an input element coupled to the input member, an intermediate element, an output element coupled to the output member, a first elastic body transmitting a torque between the input element and the intermediate element, and a second elastic body transmitting the torque between the intermediate elements and the output element; and
a dynamic damper including a mass body and a vibration absorption elastic body arranged between the mass body and the intermediate element of the damper mechanism,
wherein when "It" is defined as the moment of inertia of all elements included in a torque transmission path from the input member to the output member, "Im" is defined as the moment of inertia of the intermediate member coupled to the vibration absorption elastic body, "Idd" is defined as the moment of inertia of the mass body of the dynamic damper, "A=Im/It", "B=Idd/Im", and "Netag" is defined as a rotation speed of the internal combustion engine corresponding to a frequency of vibration to be damped by the dynamic damper, the starting device is configured so as to satisfy 0.04≤$A$≤0.10, 0.90≤$B$≤2.60 and 900 rpm≤$Netag$≤1400 rpm.

2. The starting device according to claim 1, further comprising:
a pump impeller; and
a turbine runner,
wherein the mass body of the dynamic damper includes the turbine runner.

3. The starting device according to claim 1, further comprising:
a pump impeller; and
a turbine runner,
wherein the turbine runner is coupled to the output member.

4. The starting device according to claim 1, further comprising:
a pump impeller; and
a turbine runner,
wherein the turbine runner is coupled to the input element of the damper mechanism.

5. The starting device according to claim 1, further comprising:
a pump impeller; and
a turbine runner,
wherein the intermediate element includes a first intermediate element coupled to the vibration absorption elastic body and a second intermediate element coupled to the first intermediate element through a third elastic body, and
the mass body of the dynamic damper includes the turbine runner.

6. The starting device according to claim 1, further comprising:
a pump impeller; and
a turbine runner,
wherein the intermediate element includes a first intermediate element coupled to the vibration absorption elastic body and a second intermediate element coupled to the first intermediate element through a third elastic body, and
the turbine runner is coupled to the output member.

7. The starting device according to claim 1, further comprising:
a pump impeller; and
a turbine runner,
wherein the intermediate element includes a first intermediate element coupled to the vibration absorption elastic body and a second intermediate element coupled to the first intermediate element through a third elastic body, and
the turbine runner is coupled to the input element of the damper mechanism.

8. The starting device according to claim 1, further comprising:
a lock-up clutch coupling the input member to the input element of the damper mechanism and releasing the coupling between the both.

9. The starting device according to claim 2, further comprising:
a lock-up clutch coupling the input member to the input element of the damper mechanism and releasing the coupling between the both.

10. The starting device according to claim 3, further comprising:
a lock-up clutch coupling the input member to the input element of the damper mechanism and releasing the coupling between the both.

11. The starting device according to claim 4, further comprising:
a lock-up clutch coupling the input member to the input element of the damper mechanism and releasing the coupling between the both.

12. The starting device according to claim 5, further comprising:
a lock-up clutch coupling the input member to the input element of the damper mechanism and releasing the coupling between the both.

13. The starting device according to claim 6, further comprising:
a lock-up clutch coupling the input member to the input element of the damper mechanism and releasing the coupling between the both.

14. The starting device according to claim 7, further comprising:

a lock-up clutch coupling the input member to the input element of the damper mechanism and releasing the coupling between the both.

* * * * *